F. B. MILLER.
TIRE LOCK.
APPLICATION FILED SEPT. 3, 1915.
1,178,172.
Patented Apr. 4, 1916.
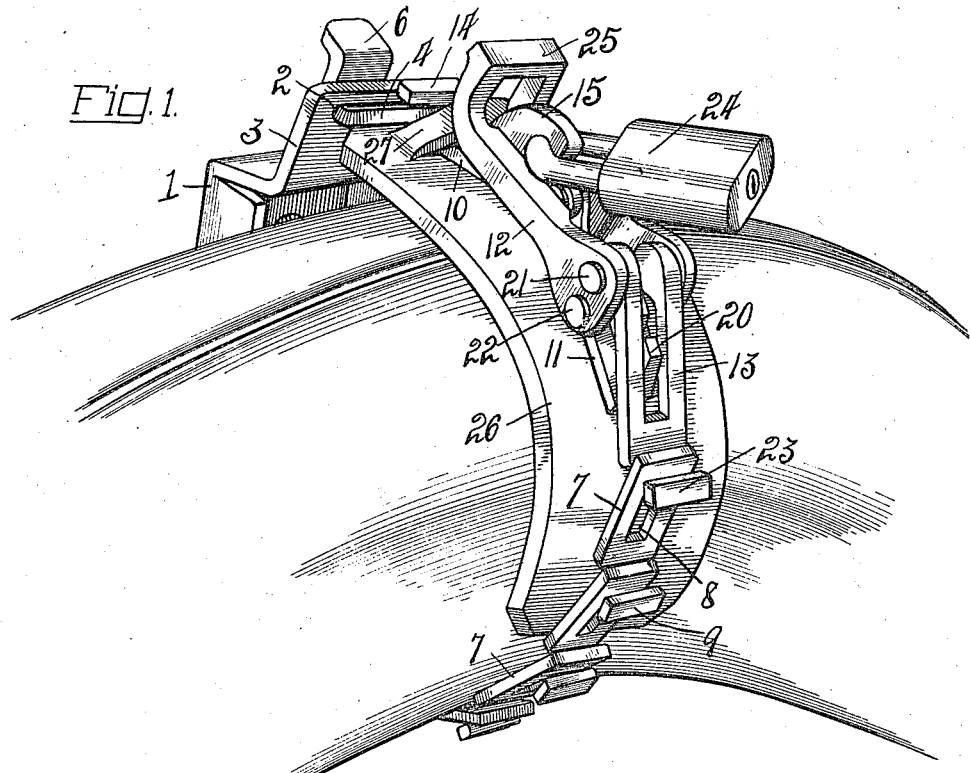
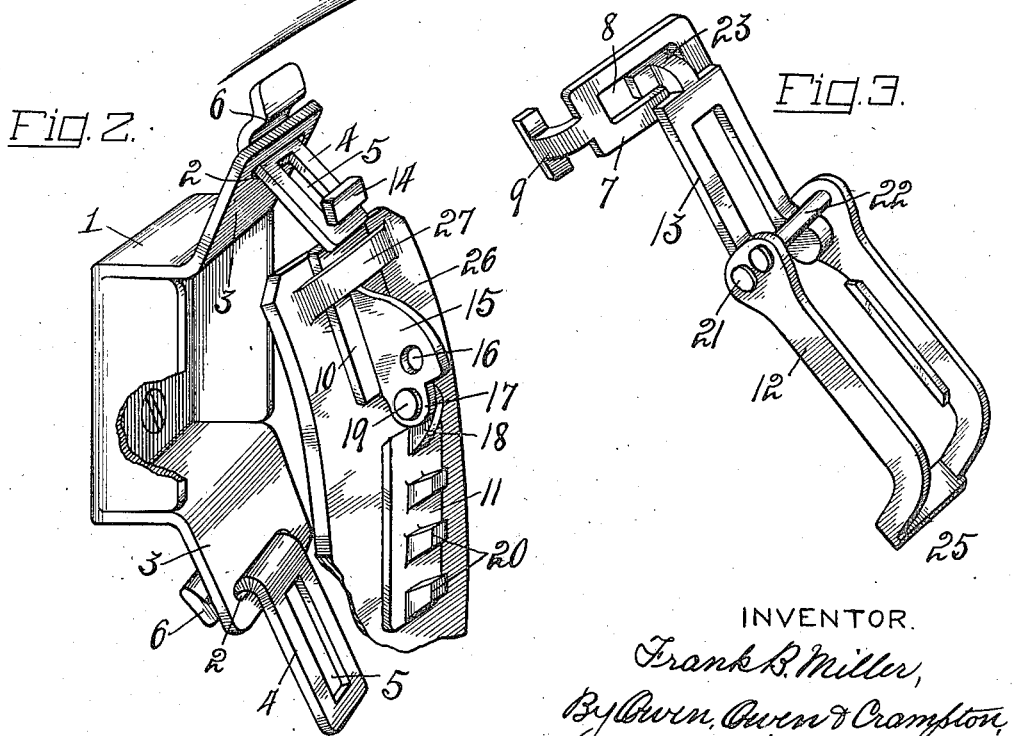
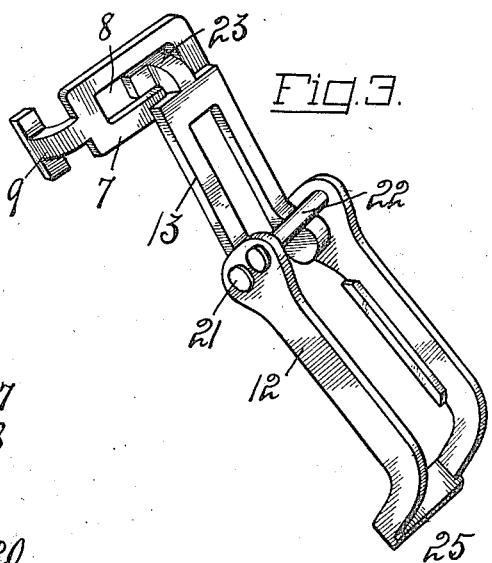
INVENTOR.
Frank B. Miller,
By Owen, Owen & Crampton,
His attys.

UNITED STATES PATENT OFFICE.

FRANK B. MILLER, OF NORWALK, OHIO, ASSIGNOR TO THE ATWOOD AUTOMOBILE COMPANY, OF TOLEDO, OHIO, A CORPORATION OF OHIO.

TIRE-LOCK.

1,178,172.     Specification of Letters Patent.     Patented Apr. 4, 1916.

Application filed September 3, 1915. Serial No. 48,801.

*To all whom it may concern:*

Be it known that I, FRANK B. MILLER, a citizen of the United States, and a resident of Norwalk, in the county of Huron and State of Ohio, have invented a certain new and useful Tire-Lock; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to automobile accessories, and particularly to means for locking extra tires on automobiles.

The object of my invention is the provision of improved locking means of this character which is simple, strong and durable in its construction, adjustable in length to accommodate one or more tires of different sizes, and operable to hold a tire to the automobile body and take the place of the tire holding straps customarily employed.

The invention is fully described in the following specification, and while, in its broader aspect, it is capable of embodiment in numerous forms, a preferred embodiment thereof is illustrated in the accompanying drawings, in which,—

Figure 1 is a perspective view of a locking means embodying my invention in locked engagement with a tire. Fig. 2 is a perspective view of the top tire bracket of an automobile with a part broken away and with portions of the tire locking means attached thereto, and Fig. 3 is a perspective view of a few of the links of the locking means including the lever link thereof.

Referring to the drawings, 1 designates a tire bracket member of the type commonly used on the back of an automobile body and sometimes at other positions on the body for holding the top tire engaging strap, the strap being threaded through slots 2 in the upper and lower wings 3 of the bracket, as is well understood in the art. The locking means comprising my invention is used in lieu of the customary tire holding strap and is of chain form with its links of the separably engaging character to permit a lengthening or shortening of the chain by the inserting or taking out of links as the size or number of tires to be locked and held to the bracket member 1 may require.

The chain forming the locking means is provided at each end with a link 4, which is provided in one end portion thereof with an elongated, longitudinally extending slot 5 and is of suitable size to be inserted through either slot 2, and has its other end of hooked form, as at 6, to prevent a complete passing of the link through the slot 2. A plurality of body links 7 are employed, the number depending on the size or number of tires to be engaged, and each of these links is provided in one end portion thereof with an elongated longitudinally extending slot 8 and at the other end thereof with a T-form of extension 9, which is bent laterally to dispose the head or cross-arm part of such extension at one side of the body portion of the link. The T-extension 9 of a link is adapted to be inserted into the slot 8 of an adjoining link when the links are disposed at right angles to each other and a relative turning of the links to alined position then causes a secure interengaging of the links, as is apparent by reference to the drawings. The body links 7 are adapted to be connected to the end links 4 in the same manner.

Interposed at any suitable or convenient position in the chain are a set of links 10, 11, 12 and 13. The link 10 is provided at one end, in the present instance, with a T-extension 14, the same as the extension 9 of the body links, for interengaging with the slotted portions of any of the links 4 or 7 and in lieu of the slot is provided in its body portion with a longitudinally extending centrally disposed web or fin 15, which preferably projects from the same side of the link as the T-extension 14. The fin 15 is provided therethrough with an opening 16 and has a lug 17 projecting longitudinally from its outer end for pivotal connection with a similar lug 18 projecting from an end of the link 11, the lugs 17 and 18 being connected by a pivot pin 19. The link 11, which is of flat form, is provided on its back or outer side with a plurality of longitudinally spaced lugs 20. The links 12 and 13 are each preferably of U-form and have the free ends of their legs pivotally connected, as at 21, and the link 12, which may be termed the lever link of the set, is provided in transversely offset relation to the pivot 21 with a bar 22 which connects the end portions of the legs of such link. The outer end of the link 13 is provided with a transversely projecting T-extension 23 for interengaging with the slot 8 in one of the body links 7 or with the slot 5 in one of the end links 4, as is apparent.

When the links 10, 11, 12 and 13 have been interposed in the chain, the links 11 and 12 are disposed adjacent to each other and form the ends of the chain which are adapted to be adjustably locked together, as the bar 22 of the link 12 is intended to engage with a desired one of the lugs 20 when the link 12 is turned partly back on the link 13 or at substantially a right angle thereto at which relative position of the links the bar 22 is most remote from the outer hooked end of the link 13. When the links 11 and 12 are engaged in this manner and the link 12 forced down over the links 10 and 11, the bar 22 will have a tightening or camming action on the engaging lug of the link 1, and effect a tightening of the chain around the engaged tire, as is apparent by reference to Fig. 1. The U-form of the links 13 and 12 enable them to straddle the lugs 20 of the link 11 and enables the link 12 to also straddle the fin 15 on the link 10. When the link 12 has been forced down onto the body portion of the link 10 the hole 16 in the fin 15 stands without the legs of the lever link 12 to permit the bow or hasp of a padlock 24 to be inserted therethrough over the legs of the link 12 to secure the links 10 and 12 in locked engagement. The outer or looped end of the lever link 12 is preferably transversely bent to provide an outwardly offset handle portion 25 for the lever.

It is preferable to dispose a pad 26 of leather or other suitable material at the inner side of the portion of the chain which engages around the outer side of the tire to prevent direct contact of the chain with the tire. The body 26 is provided with a loop 27 at one end for receiving an end portion of one of the links of the chain, the link 10, in the present instance, being shown as interengaging with such loop, thereby retaining the pad in assembled relation to the chain.

It is evident in the use of my improved tire locking means that a tire can be easily and quickly clamped in locked engagement to the bracket 1 by simply drawing the ends of the chain, which carry the links 11 and 12, together around the tire, placing the bar 22 in hooked engagement with a desired lug 20 and then forcing the lever link 12 down on the link 10 to effect a final tightening of the chain around the tire and to place the lever in locking position. This having been done the hasp of the padlock 24 is inserted through the fin 15 without the legs of the lever link 12, thereby securely locking the ends of the chain sections together around the tire.

It is evident that the links 10, 11, 12 and 13 may be disposed in any desired or convenient position in the chain, and that the body links 7 may be used in any desired number depending on the size or number of tires engaged.

I wish it understood that my invention is not limited to any specific construction, arrangement or form of the parts or to securing the chain to a bracket member shown, as numerous modifications of the invention and the form of bracket to which it is engaged may be made without departing from the spirit of the claims.

Having thus described my invention, what I claim as new, and desire to secure by Letters Patent, is,—

1. A tire holder comprising a fixed bracket part, chain sections extending from said part and each comprising a plurality of detachably connected links, with the outer links of the sections forming parts of an interengaging adjustably connecting means for the sections.

2. A tire holder and lock comprising a fixed bracket part, two chain sections anchored to and extending from said part and each comprising a plurality of links, with the outer link of one section formed with a plurality of longitudinally spaced laterally projecting lugs, and the outer link of the other section forming a lever for engaging any one of said lugs and effecting a tightening of the sections around an inclosed object, and means for locking said end sections in interengaging relation.

3. In a tire holder and lock, a bracket, flexible sections projecting from said bracket, one section having its free end provided with an outwardly projecting fin and without said fin with a plurality of longitudinally spaced outwardly projecting lugs, and the other section having a cam lever pivoted thereto for engaging and coöperating with any of said lugs to connect and tighten the chain sections, and means coöperating with said fin to prevent a releasing movement of said lever from section connecting position.

4. In a device of the class described, a bracket having slotted wings projecting in opposite directions therefrom, chain sections releasably interengaged with said slotted wings, and means having parts carried at the outer ends of said sections and operable to connect and tighten said sections, and a lock for coöperating with parts of said means for retaining the sections in interlocked engagement.

5. In a device of the class described, a bracket having slotted portions at opposite sides thereof, chain links projected partially through said slotted portions of said bracket and anchored thereto, chain sections anchored to and projecting outwardly from said anchoring links, means having parts carried by said sections at the outer ends thereof and operable to adjustably connect and tighten the sections, and locking means for retaining the parts of said first means in engaged relation.

6. In a device of the class described, a bracket having slotted portions at opposite sides thereof, a link projected outwardly through each slot and having its outer end slotted and its inner end formed to prevent a complete outward withdrawal of the link through the slotted part, chain sections releasably connected to the slotted outer ends of said links, said sections being composed, of separably connected links, one section having its outer link provided with outwardly projecting lugs and the other section having a pivot lever member provided with a cross bar in offset relation to its pivot for engaging any one of the lugs on the other section, the lever being movable in engagement with a lug of the other section to connect and tighten the sections, and means for locking the lever in engaged relation to the sections.

7. In a device of the class described, a bracket member, chain sections projecting outwardly from said member, interengaging means carried at the outer ends of said sections and operable to connect and tighten the sections, means for securing said means in tightened relation, and a protector part carried by one section at the inner side thereof and extending a considerable distance around the inner side of the connected chain sections.

In testimony whereof, I have hereunto signed my name to this specification.

FRANK B. MILLER.